US012202427B2

(12) United States Patent
Takahira

(10) Patent No.: US 12,202,427 B2
(45) Date of Patent: Jan. 21, 2025

(54) VEHICLE OCCUPANT RESTRAINT STRUCTURE

(71) Applicant: TOYOTA JIDOSHA KABUSHIKI KAISHA, Toyota (JP)

(72) Inventor: Yoshiki Takahira, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/523,884

(22) Filed: Nov. 30, 2023

(65) Prior Publication Data

US 2024/0239289 A1 Jul. 18, 2024

(30) Foreign Application Priority Data

Jan. 16, 2023 (JP) .................. 2023-004732

(51) Int. Cl.
*B60R 21/207* (2006.01)
*B60R 21/233* (2006.01)
*B60R 21/2338* (2011.01)

(52) U.S. Cl.
CPC .. *B60R 21/207* (2013.01); *B60R 2021/23324* (2013.01); *B60R 2021/23382* (2013.01)

(58) Field of Classification Search
CPC ........ B60R 21/207; B60R 2021/23324; B60R 2021/23382; B60R 2021/0053; B60R 2021/022; B61D 33/00; B60N 2002/0212; B60N 2/427; B60N 2/00; B60N 2/4263; B60N 2/42763

See application file for complete search history.

(56) References Cited

U.S. PATENT DOCUMENTS

| | | | |
|---|---|---|---|
| 9,283,916 B2 * | 3/2016 | Nagasawa | B60R 21/231 |
| 11,247,629 B1 * | 2/2022 | El-Jawahri | B60R 21/01554 |
| 2019/0106029 A1 | 4/2019 | Komura et al. | |
| 2019/0337427 A1 * | 11/2019 | Thomas | B60N 2/427 |

FOREIGN PATENT DOCUMENTS

| | | | | |
|---|---|---|---|---|
| EP | 2316697 A1 * | 5/2011 | .......... | B60R 21/231 |
| JP | H07-081466 A | 3/1995 | | |
| JP | 2019-034653 A | 3/2019 | | |
| JP | 2019-064553 A | 4/2019 | | |

\* cited by examiner

*Primary Examiner* — Paul N Dickson
*Assistant Examiner* — Matthew Joseph Ganci
(74) *Attorney, Agent, or Firm* — SOLARIS Intellectual Property Group, PLLC

(57) ABSTRACT

The present disclosure provides a vehicle occupant restraint structure including a vehicle seat that includes a cushion pan configuring a bottom portion of a seat cushion and supporting a seat pad, and that is provided at a floor of a vehicle cabin, and an airbag that is provided at a lower surface of a front end portion of the cushion pan, and that inflates and deploys toward the floor when a front collision of a vehicle occurs.

6 Claims, 11 Drawing Sheets

VEHICLE OCCUPANT RESTRAINT STRUCTURE

CROSS-REFERENCE TO RELATED APPLICATION

This application is based on and claims priority under 35 USC 119 from Japanese Patent Application No. 2023-004732, filed on Jan. 16, 2023, the disclosure of which is incorporated by reference herein.

BACKGROUND

Technical Field

The present disclosure relates to a vehicle occupant restraint structure.

Related Art

A vehicle seat is conventionally known in which a front panel configuring a portion of a front portion of a seat cushion is rotated toward an upper side by an electric tilt mechanism when a front collision of a vehicle is predicted, and a seat cushion airbag on the front panel is inflated and deployed when a subsequent front collision occurs (refer to, for example, Japanese Patent Application Laid-Open (JP-A) No. 2019-064553).

However, when an occupant moves toward a front side due to inertial force when a front collision of a vehicle occurs, even if a seat cushion airbag is provided, a front end portion of a seat frame member supporting the seat cushion airbag may deform (sink) toward a lower side. In this case, there is a possibility that a waist region of the occupant may drop, a knee region of the occupant may abut against an instrument panel and bend, and a lap belt, which is a portion of a seat belt, may be relatively displaced toward an upper side and bite into an abdominal region of the occupant. Namely, there is a possibility that a restraining force exerted by the seat belt against the waist region of the occupant may be reduced.

SUMMARY

Accordingly, the present disclosure provides a vehicle occupant restraint structure capable of suppressing a reduction in restraining force exerted by a seat belt against a waist region of an occupant even when the occupant moves toward a vehicle front side due to inertial force when a front collision of a vehicle occurs.

A vehicle occupant restraint structure of a first aspect according to the present disclosure includes: a vehicle seat that includes a cushion pan configuring a bottom portion of a seat cushion and supporting a seat pad, and that is provided at a floor of a vehicle cabin; and an airbag that is provided at a lower surface of a front end portion of the cushion pan, and that inflates and deploys toward the floor when a front collision of a vehicle occurs.

According to the disclosure of the first aspect, the airbag, which inflates and deploys toward the floor of the vehicle cabin when a front collision of the vehicle occurs, is provided at the lower surface of the front end portion of the cushion pan of the vehicle seat. Accordingly, even if an occupant moves toward a vehicle front side due to inertial force, a front end portion of the seat cushion is inhibited from deforming (sinking) toward a vehicle lower side by the airbag. Namely, according to the present disclosure, even if the occupant moves toward the vehicle front side due to inertial force when a front collision of the vehicle occurs, a waist region of the occupant is inhibited from dropping, and a reduction in restraining force exerted by a seat belt against the waist region of the occupant is suppressed. It should be noted that "when a front collision of a vehicle occurs" includes not only when a front collision of a vehicle has been detected, but also when a front collision of a vehicle has been predicted.

Further, a vehicle occupant restraint structure of a second aspect according to the present disclosure is the vehicle occupant restraint structure of the first aspect, wherein the vehicle seat is configured to be movable in a vehicle front-rear direction along a pair of slide rails, front sides of which are supported by a cross member provided at the floor and extending in a vehicle width direction, due to operation of a slide lever that is disposed at a lower side of the lower surface of the cushion pan and that substantially has a U-shape in a plan view, and the airbag is configured so as to inflate and deploy through an inner side of the slide lever, and such that a rear wall after inflation and deployment contacts a front wall of the cross member.

According to the disclosure of the second aspect, the airbag is configured so as to inflate and deploy through the inner side of the slide lever, and such that the rear wall after inflation and deployment contacts the front wall of the cross member. Accordingly, swinging of the airbag at a time of inflation and deployment is suppressed, and a deployment posture of the airbag is stabilized.

Further, a vehicle occupant restraint structure of a third aspect according to the present disclosure includes a vehicle seat that includes a cushion pan configuring a bottom portion of a seat cushion and supporting a seat pad, and that is provided at a floor of a vehicle cabin; and an airbag that is provided at a portion of the floor that is positioned directly below a lower surface of a front end portion of the cushion pan, and that inflates and deploys toward the lower surface of the cushion pan when a front collision of a vehicle occurs.

According to the disclosure of the third aspect, the airbag, which inflates and deploys toward the lower surface of the front end portion of the cushion pan when a front collision of the vehicle occurs, is provided at the portion of the floor of the vehicle cabin that is positioned directly below the lower surface of the front end portion of the cushion pan of the vehicle seat. Accordingly, even if an occupant moves toward a vehicle front side due to inertial force, a front end portion of the seat cushion is inhibited from deforming (sinking) toward a vehicle lower side by the airbag. Namely, according to the present disclosure, even if the occupant moves toward the vehicle front side due to inertial force at the time of a front collision of the vehicle, a waist region of the occupant is inhibited from dropping, and a reduction in restraining force exerted by a seat belt against the waist region of the occupant is suppressed. It should be noted that "when a front collision of a vehicle occurs" includes not only when a front collision of a vehicle has been detected, but also when a front collision of a vehicle has been predicted.

Further, a vehicle occupant restraint structure of a fourth aspect according to the present disclosure is the vehicle occupant restraint structure of any one of the first to third aspects, wherein plural tethers that connect a front wall and a rear wall of the airbag are provided at an interior of the airbag at intervals in an up-down direction.

According to the disclosure of the fourth aspect, the plural tethers that connect the front wall and the rear wall of the airbag are provided at the interior of the airbag at intervals in the up-down direction. Accordingly, when a front collision of the vehicle occurs, even if a load is applied to the airbag from the vehicle upper side due to the occupant moving toward the vehicle front side due to inertial force, spreading of the airbag in the vehicle front-rear direction is suppressed. Namely, reduction in height of the airbag is effectively suppressed, and deformation (sinking) of the front end portion of the seat cushion toward the vehicle lower side is effectively suppressed.

Further, a vehicle occupant restraint structure of a fifth aspect according to the present disclosure is the vehicle occupant restraint structure of any one of the first to fourth aspects, wherein a magnet is provided at an inner surface of an end portion at a deployment direction leading end side of the airbag.

According to the disclosure of the fifth aspect, the magnet is provided at the inner surface of the end portion at the deployment direction leading end side of the airbag. Namely, the end portion at the deployment direction leading end side of the airbag after inflation and deployment is attracted to the portion of the floor or to the lower surface of the front end portion of the cushion pan. Accordingly, swinging (particularly movement toward the vehicle front side) of the end portion at the deployment direction leading end side of the airbag after inflation and deployment is suppressed, and deformation (sinking) of the front end portion of the seat cushion toward the vehicle lower side is effectively suppressed.

Further, a vehicle occupant restraint structure of a sixth aspect according to the present disclosure is the vehicle occupant restraint structure of the first or second aspect, wherein the floor includes a projection that regulates a position of a front wall of the airbag after inflation and deployment.

According to the disclosure of the sixth aspect, the projection that regulates the position of the front wall of the airbag after inflation and deployment is provided at the floor. Accordingly, movement of the airbag after inflation and deployment toward the vehicle front side is suppressed, and deformation (sinking) of the front end portion of the seat cushion toward the vehicle lower side is effectively suppressed.

As described above, according to the present disclosure, even if the occupant moves toward the vehicle front side due to inertial force when a front collision of the vehicle occurs, a reduction in restraining force exerted by the seat belt against the waist region of the occupant can be suppressed.

DETAILED DESCRIPTION

Below, exemplary embodiments according to the present disclosure will be explained in detail based on the drawings. It should be noted that, for simplicity of explanation, arrow UP illustrated in the respective drawings indicates an upward direction of a vehicle and a vehicle seat, arrow FR indicates a forward direction of the vehicle and the vehicle seat, arrow LH indicates a leftward direction of the vehicle and the vehicle seat, and arrow RH indicates a rightward direction of the vehicle and the vehicle seat. Accordingly, in the following explanation, in cases in which up-down, front-rear, and left-right directions are described without particular notation to the contrary, these indicate up-down, front-rear, and left-right directions of the vehicle and the vehicle seat. Further, the left-right direction corresponds to the vehicle width direction and the seat width direction.

First Exemplary Embodiment

Figure 3A:
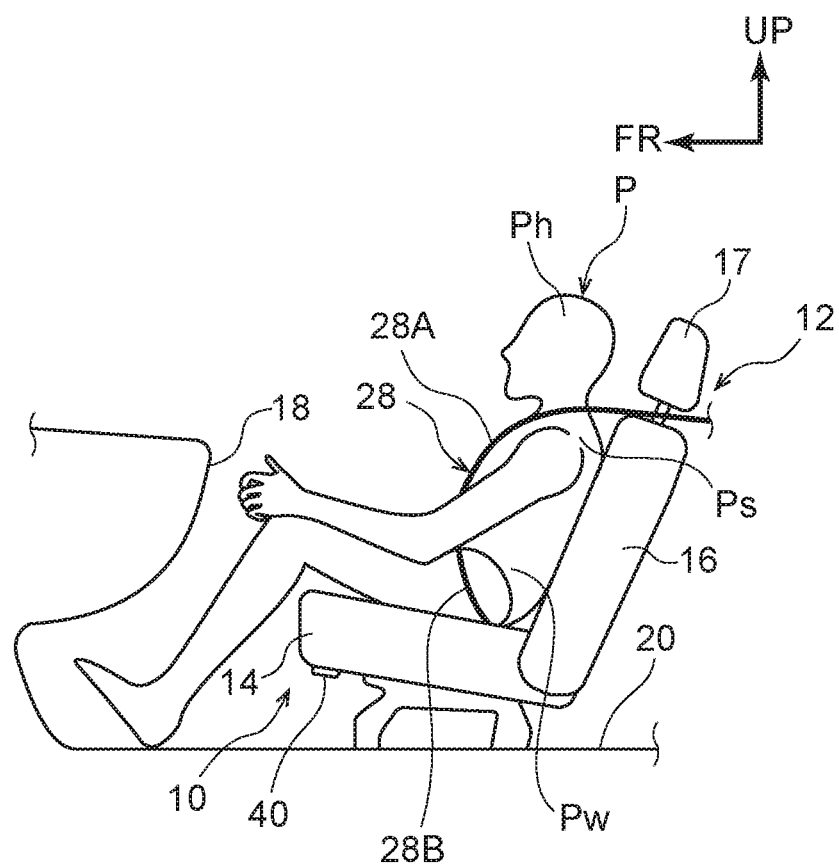
FIG. 3A is a schematic side view illustrating a state, prior to a front collision, of the vehicle occupant restraint structure according to the first exemplary embodiment.

First, a first exemplary embodiment will be explained. As illustrated in FIG. 3A, a vehicle seat 12 configuring a vehicle occupant restraint structure 10 according to the first exemplary embodiment is provided at a floor 20 of a vehicle cabin at a rear side of an instrument panel 18. The vehicle seat 12 includes a seat cushion 14 at which an occupant P is seated (supporting buttocks and thighs of the occupant P), a seat back 16 that supports a back of the occupant P, and a headrest 17 that supports a head Ph of the occupant P.

In a side view viewed in a vehicle width direction (i.e., a seat width direction), the seat cushion 14 extends in a front-rear direction, and the seat back 16 is connected to a rear end portion of the seat cushion 14 so as to be rotatable with the seat width direction as an axial direction, and extends in an up-down direction. The headrest 17 is provided so as to be able to move up and down at a seat width direction center portion of an upper end portion of the seat back 16.

It should be noted that the floor 20 is made of metal (such as, for example, iron) that is capable of attracting a magnet 52, which will be described later. Further, a configuration is provided such that the occupant P is restrained at the vehicle seat 12 by a seat belt 28. A portion of the seat belt 28 that spans diagonally from a shoulder region Ps to a waist region Pw of the occupant P is a shoulder belt 28A, and a portion of the seat belt 28 that spans leftward and rightward of the waist region Pw of the occupant P is a lap belt 28B.

Figure 1A:
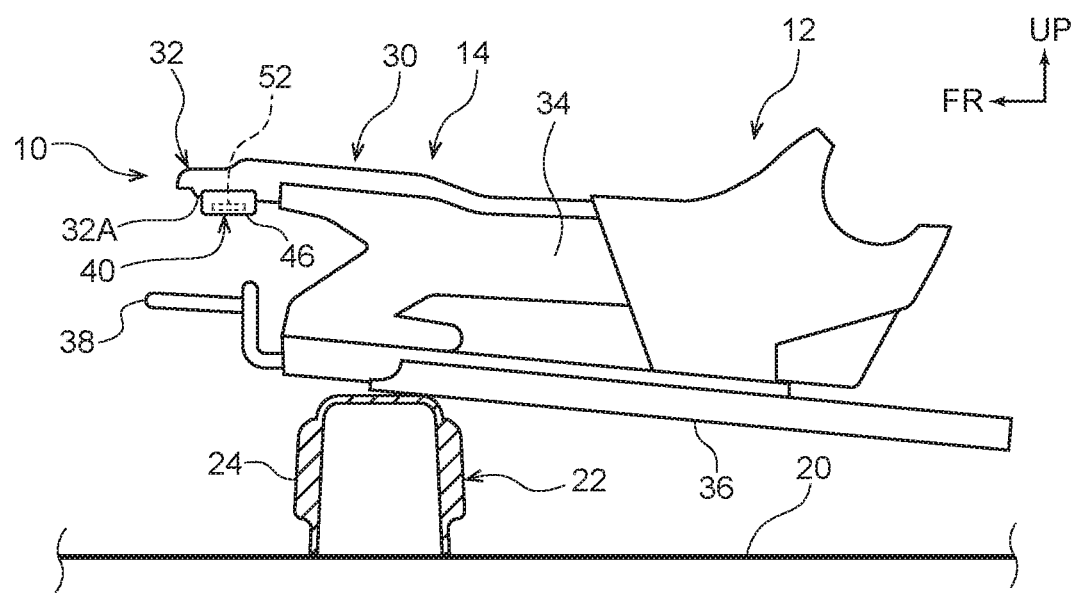
FIG. 1A is a schematic side view illustrating a vehicle occupant restraint structure according to a first exemplary embodiment.

As illustrated in FIG. 1A, a cross member 22 made of metal (such as, for example, iron) that extends in the vehicle width direction is provided at the floor 20. The cross member 22 is formed in a substantially hat-shaped shape in a side view, and a front side flange portion (not illustrated in the drawings) and a rear side flange portion (not illustrated in the drawings) are joined to an upper surface of the floor 20 by welding or the like. It should be noted that a floor carpet (not illustrated in the drawings) is disposed at the upper surface of the floor 20.

Further, front sides of a pair of left and right slide rails 36 are attached to and supported by an upper surface of the cross member 22. The vehicle seat 12 is configured to be able to move (or slide) in the front-rear direction along the pair of slide rails 36. More specifically, as illustrated in FIG. 1A and FIG. 1B, a cushion pan 30 made of metal (such as, for example, iron) that configures a bottom portion of the seat cushion 14 and supports a seat pad (not illustrated in the drawings) is provided at the seat cushion 14.

Legs 34 are provided on both left and right sides of the cushion pan 30, and the legs 34 are respectively supported so as to be slidable at the left and right slide rails 36. A slide lever 38 is disposed at a lower side of a lower surface 32A of a front end portion 32 of the cushion pan 30, and has a substantially U-shaped configuration in which a rear side thereof is an open side in a plan view (i.e., a bottom view). The vehicle seat 12 (or the legs 34) is configured such that, by performing an operation to pull up the slide lever 38, locking with respect to the slide rails 36 is released, and the vehicle seat 12 (or the legs 34) becomes slidable in the front-rear direction.

Figure 1B:
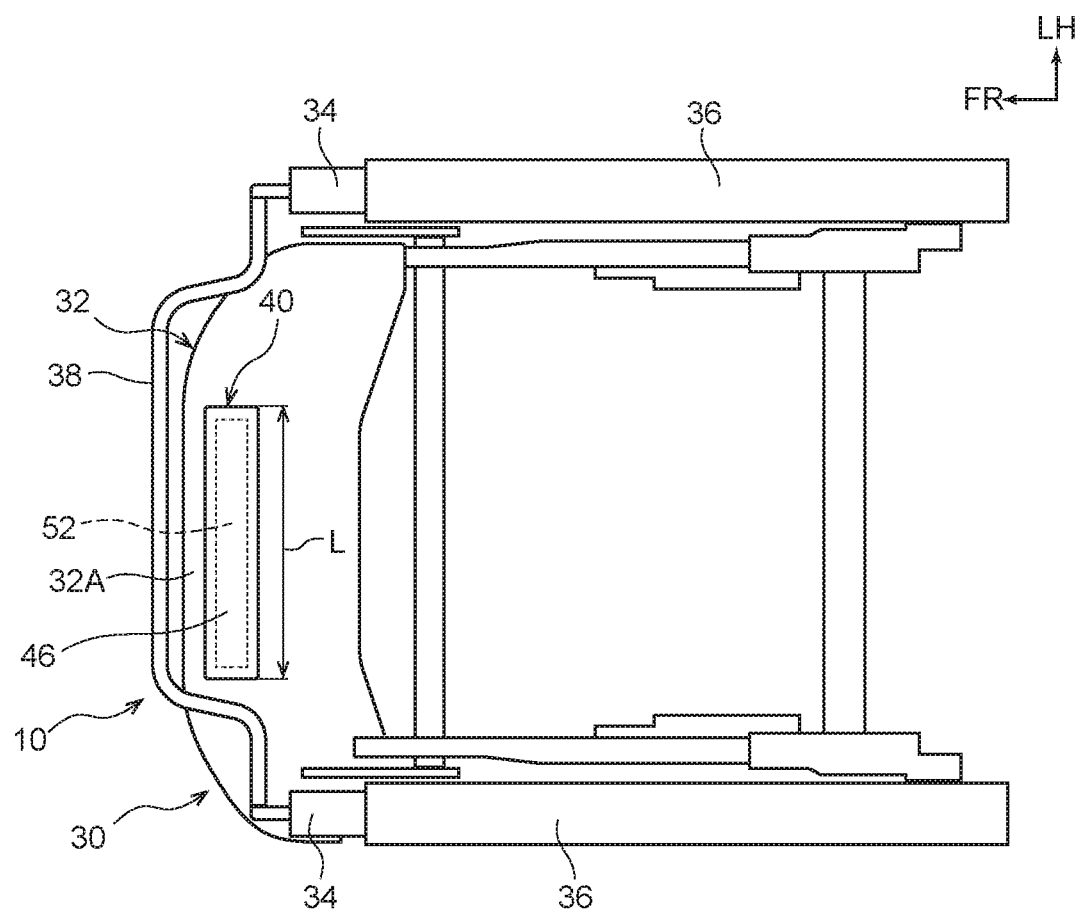
FIG. 1B is a schematic bottom view illustrating the vehicle occupant restraint structure according to the first exemplary embodiment.
Figure 2A:
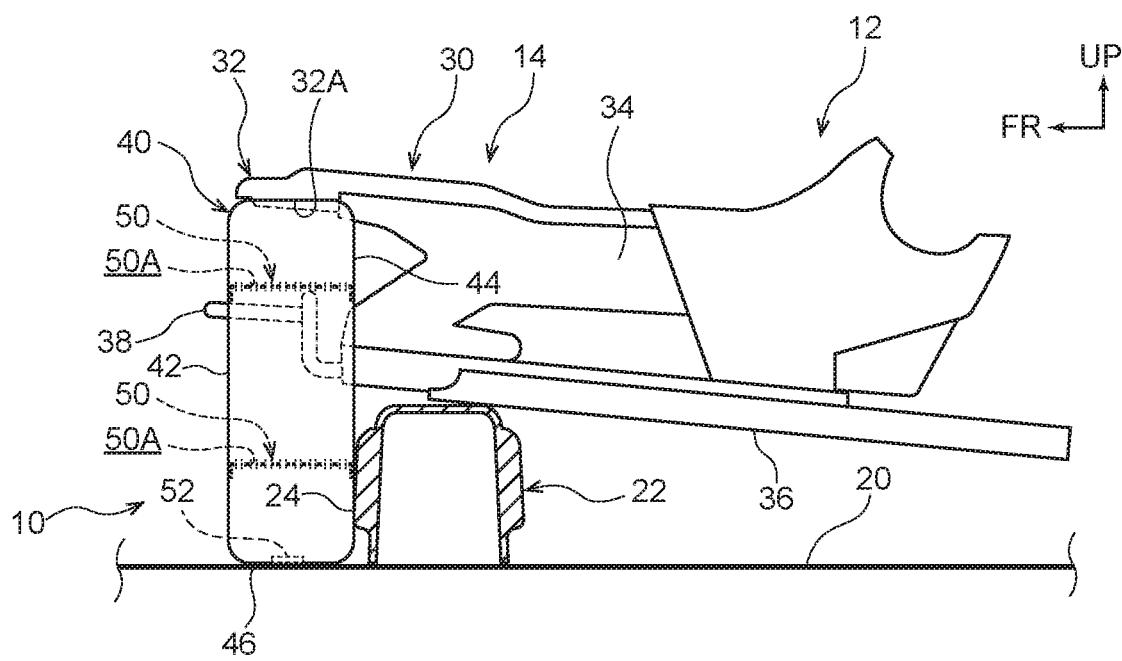
FIG. 2A is a schematic side view illustrating an inflation and deployment state of an airbag configuring the vehicle occupant restraint structure according to the first exemplary embodiment.

Further, as illustrated in FIG. 1A, FIG. 1B, and FIG. 2A, an airbag 40 (i.e., an airbag module) that inflates and deploys toward the floor 20 (i.e., toward the lower side) is provided at the lower surface 32A of the front end portion 32 of the cushion pan 30. The airbag 40 is not provided with a vent hole for exhausting gas, and a length L of the airbag 40 along the left-right direction is set to a length (for example, 150 mm to 200 mm) sufficient to cover a distance between ischial tuberosities of a large occupant P.

Further, an inflator (not illustrated in the drawings), which is a cylinder-type gas generating device, is provided at a lower surface of the cushion pan 30 further toward a rear side than the airbag 40. The inflator is operable when a front collision of the vehicle has been detected or predicted (hereafter referred to as a "time of a front collision") so as to be able to instantaneously supply gas to an interior of the airbag 40.

It should be noted that an ignition timing of this inflator is preferably the same ignition timing as for an inflator (not illustrated in the drawings) that supplies gas to an airbag provided at a steering wheel (not illustrated in the drawings) or an inflator (not illustrated in the drawings) that actuates a pretensioner (not illustrated in the drawings) of the seat belt 28. This is because, since the airbag 40 does not have a vent hole as described above, an internal pressure can be maintained, and the faster the restraint against the waist region Pw of the occupant P (i.e., suppression of dropping of the waist region Pw) is, the better.

Further, at the interior of the airbag 40, plural tethers 50 (two illustrated in the drawings) having a rectangular cloth shape (i.e., a rectangular shape having the left-right direction as a longitudinal direction thereof) that connect a front wall 42 and a rear wall 44 of the airbag 40 are provided at intervals in the up-down direction. Plural through holes 50A are formed at the respective tethers 50 so as to allow gas supplied from the inflator to flow through the respective through holes 50A. A magnet 52 is provided at an inner surface of a lower wall 46, which is an end portion at a deployment direction leading end side of the airbag 40.

The magnet 52 is singly formed in a rectangular flat plate shape having the left-right direction as a longitudinal direction thereof, and is joined to the inner surface of the lower wall 46 of the airbag 40 by an adhesive or the like. Accordingly, when the airbag 40 is inflated and deployed, the magnet 52 is attracted to the floor 20 through the lower wall 46 and the floor carpet. It should be noted that, in order to enable the magnet 52 to be firmly attracted to the floor 20, it is preferable that a portion of the floor carpet (i.e., a portion directly below the magnet 52) be formed thinner than the other portions thereof.

Further, as illustrated in FIG. 2A, the airbag 40 is configured so as to be inflated and deployed through the inner side of the slide lever 38 and so that the rear wall 44 after inflation and deployment contacts a front wall 24 of the cross member 22, when the vehicle seat 12 is in a standard position (i.e., a neutral position). Namely, the airbag 40 after inflation and deployment is configured to be sandwiched between the slide lever 38 and the front wall 24 of the cross member 22 from front and rear directions.

Next, operation of the vehicle occupant restraint structure 10 according to the first exemplary embodiment configured as described above will be explained.

Figure 6A:
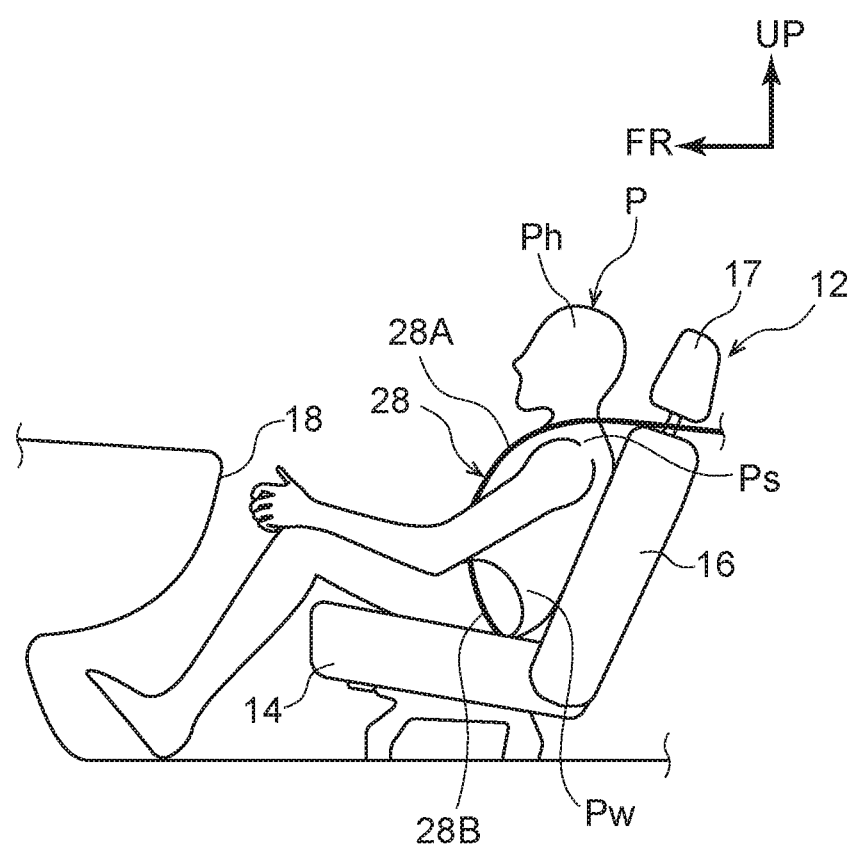
FIG. 6A is a schematic side view illustrating a state, prior to a front collision, of a vehicle occupant restraint structure according to a comparative example.
Figure 6B:
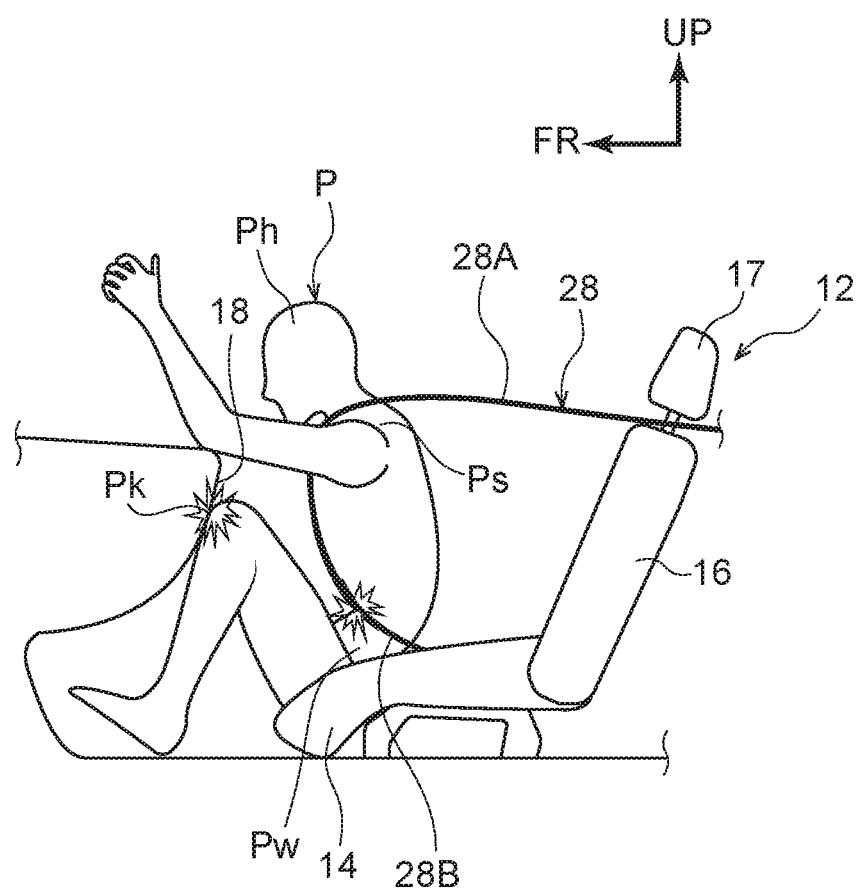
FIG. 6B is a schematic side view illustrating a state, when a front collision occurs, of the vehicle occupant restraint structure according to the comparative example.

First, a comparative example will be explained. As illustrated in FIG. 6A, the cushion pan (not illustrated in the drawings) of the vehicle seat 12 is not provided with the airbag 40. As illustrated in FIG. 6B, when the occupant P, particularly a large occupant, moves toward the front side due to inertial force when a front collision of the vehicle occurs, the front end portion of the seat cushion 14 deforms (sinks) toward the lower side.

As a result, the waist region Pw of the occupant P drops, a knee region Pk of the occupant P abuts against the instrument panel 18 and bends, and the lap belt 28B, which is a portion of the seat belt 28, is relatively displaced toward the upper side and bites into an abdominal region of the occupant P. Namely, restraining force exerted by the seat belt 28 against the waist region Pw of the occupant P is reduced.

In contrast, in the vehicle occupant restraint structure 10 according to the first exemplary embodiment, as illustrated in FIG. 3A, the airbag 40 (i.e., the airbag module) that inflates and deploys toward the floor 20 is provided at the lower surface 32A (refer to FIG. 1A and FIG. 1B) of the front end portion 32 of the cushion pan 30 of the vehicle seat 12.

Figure 3B:
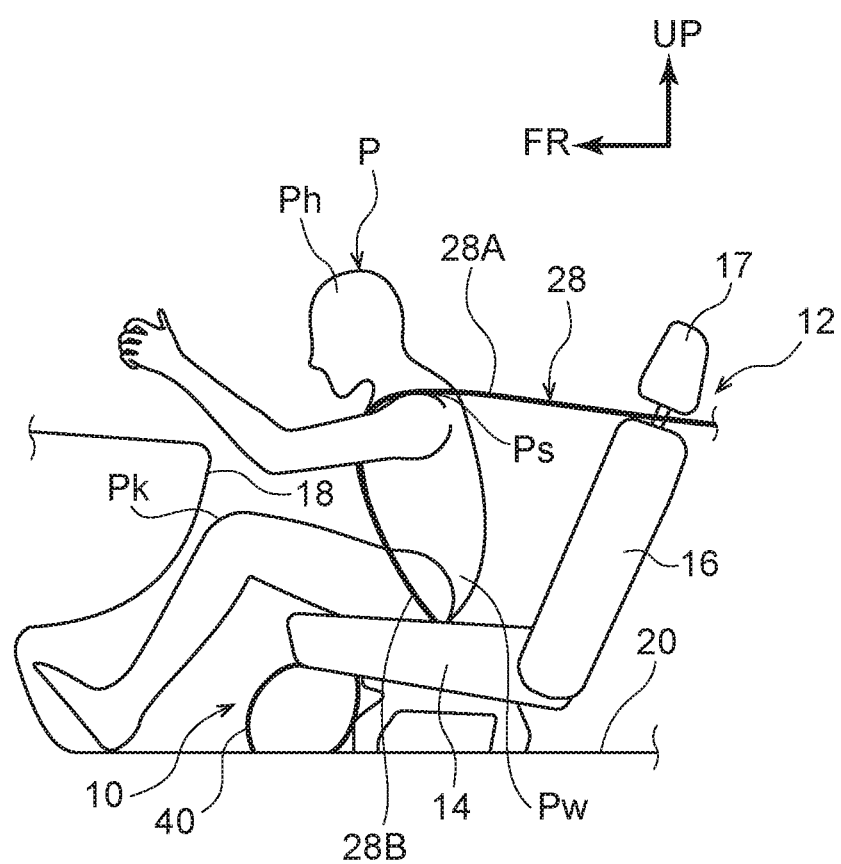
FIG. 3B is a schematic side view illustrating a state, when a front collision occurs, of the vehicle occupant restraint structure according to the first exemplary embodiment.

Accordingly, when a front collision of the vehicle occurs, the airbag 40 instantaneously inflates and deploys toward the floor 20, and the lower wall 46 thereof is attracted and fixed to a portion of the floor 20 due to the magnet 52 (refer to FIG. 2A). Namely, as illustrated in FIG. 3B, the airbag 40 is sandwiched between the cushion pan 30 and the floor 20. Consequently, even if the occupant P moves toward the front side due to inertial force when a front collision of the vehicle occurs, the airbag 40 inhibits the front end portion of the seat cushion 14 from deforming (sinking) toward the lower side.

As a result, the waist region Pw of the occupant P is inhibited from dropping, the knee region Pk of the occupant P is inhibited from abutting against the instrument panel 18, and the lap belt 28B, which is a portion of the seat belt 28, is inhibited from relatively displacing toward the upper side. Namely, it is possible to suppress a reduction in the restraining force exerted by the seat belt 28 against the waist region Pw of the occupant P.

Moreover, the airbag 40 is configured such that, when the vehicle seat 12 is in the standard position (i.e., the neutral position), the airbag 40 is inflated and deployed through the inner side of the slide lever 38, and the rear wall 44 after inflation and deployment contacts the front wall 24 of the cross member 22 (refer to FIG. 2A). Consequently, swinging of the airbag 40 at the time of inflation and deployment can be suppressed, and a deployment posture of the airbag 40 can be stabilized.

Further, the plural tethers 50 connecting the front wall 42 and the rear wall 44 of the airbag 40 are provided at the interior of the airbag 40 at intervals in the up-down direction. Accordingly, when a front collision of the vehicle occurs, even if a load (a weight of the occupant P) is applied to the airbag 40 from the upper side due to the occupant P moving toward the front side due to inertial force, spreading of the airbag 40 in the front-rear direction can be suppressed. Namely, reduction in height of the airbag 40 can be effectively suppressed, and deformation (sinking) of the front end portion of the seat cushion 14 toward the lower side can be effectively suppressed.

Further, since the magnet 52 is provided at the inner surface of the lower wall 46 (end portion at the deployment direction leading end side) of the airbag 40, the lower wall 46 of the airbag 40 after inflation and deployment is attracted and fixed to a portion of the floor 20. Accordingly, swinging (particularly movement toward the front side) of the lower wall 46 of the airbag 40 after inflation and deployment can be suppressed or prevented, and deformation (sinking) of the front end portion of the seat cushion 14 toward the lower side can be effectively suppressed.

Further, since the airbag 40 is used as a suppressing member that suppresses deformation (sinking) of the front end portion of the seat cushion 14 toward the lower side, the airbag 40 can be housed compactly (with a small thickness) at normal times, and the front end portion of the seat cushion 14 can be reliably supported from the lower side until before the occupant P moves toward the front side due to inertial force.

Modified Example

Figure 2B:
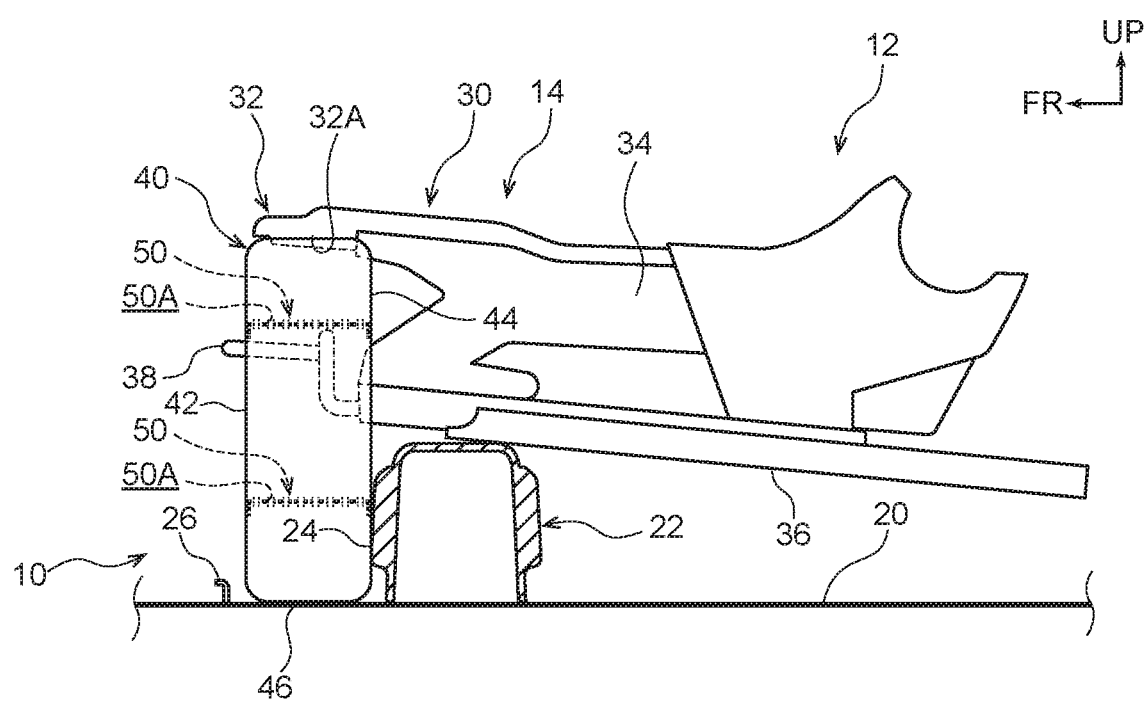
FIG. 2B is a schematic side view illustrating an inflation and deployment state of an airbag configuring a vehicle occupant restraint structure according to a modified example of the first exemplary embodiment.

It should be noted that, as illustrated in FIG. 2B, instead of providing the magnet 52 at the inner surface of the lower wall 46 of the airbag 40, a projection 26 substantially having an inverted L-shape in a side view that extends in the left-right direction, for example, may be provided so as to project at a predetermined position at the floor 20 on a front side of the cross member 22. Namely, a configuration may be provided in which a position of the front wall 42 at a lower wall 46 side of the airbag 40 after inflation and deployment is regulated by the projection 26.

Even with such a configuration, since swinging (movement toward the front side) of the lower wall 46 of the airbag 40 after inflation and deployment can be suppressed or prevented, deformation (sinking) of the front end portion of the seat cushion 14 toward the lower side can be effectively suppressed. It should be noted that the shape of the projection 26 is not limited to the substantial inverted L-shape in a side view that is illustrated in the drawings, and may be any shape that can effectively regulate the position of the front wall 42 at the lower wall 46 side of the airbag 40 after inflation and deployment.

Second Exemplary Embodiment

Next, a second exemplary embodiment will be explained. It should be noted that the same reference numerals are allocated to parts that are equivalent to those in the first exemplary embodiment described above, and that detailed explanation thereof, including common operation, is omitted.

Figure 4A:
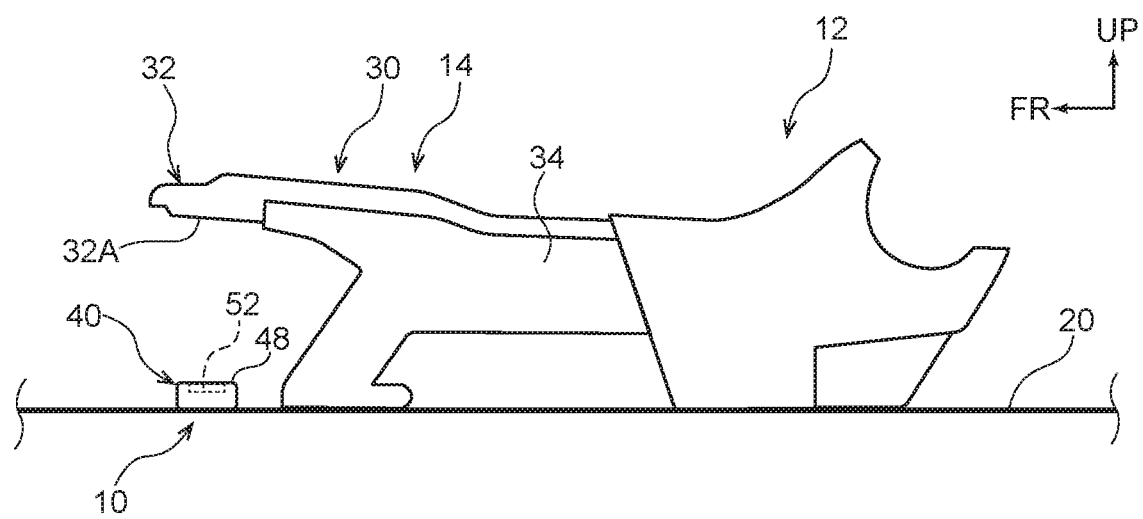
FIG. 4A is a schematic side view illustrating a vehicle occupant restraint structure according to a second exemplary embodiment.

As illustrated in FIG. 4A, the vehicle seat 12 configuring the vehicle occupant restraint structure 10 according to the second exemplary embodiment is configured so as not to be able to move (slide), i.e., the vehicle seat 12 is fixed to the floor 20. Examples of vehicles in which the vehicle seat 12 is fixed to the floor 20 include, for example, Mobility as a Service (MaaS) vehicles and the like.

Figure 4B:
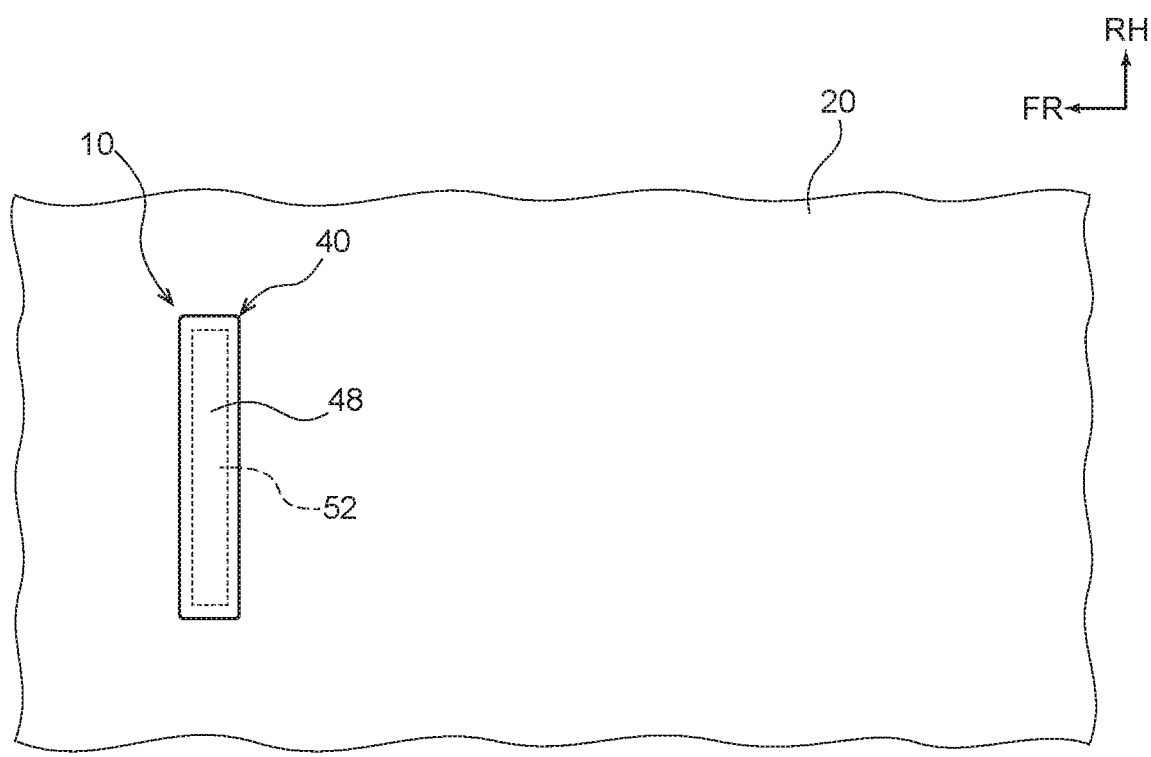
FIG. 4B is a schematic plan view illustrating the vehicle occupant restraint structure according to the second exemplary embodiment.

As illustrated in FIG. 4A and FIG. 4B, in the vehicle occupant restraint structure 10 according to the second exemplary embodiment, the airbag 40 (airbag module), which is inflated and deployed toward the lower surface 32A at the front end portion 32 of the cushion pan 30 when a front collision of the vehicle occurs, is provided at a portion of the floor 20 that is positioned directly below the lower surface 32A at the front end portion 32 of the cushion pan 30, instead of being provided at the lower surface 32A at the front end portion 32 of the cushion pan 30.

Accordingly, the magnet 52 is provided at an inner surface of an upper wall 48, which is the end portion at the deployment direction leading end side of the airbag 40. It should be noted that, although not illustrated in the drawings, the inflator is provided at a lower surface side of the floor 20. Further, a cut (not illustrated in the drawings) or the like is formed at a portion of the floor carpet that faces the airbag 40 (airbag module) in the up-down direction, so as to facilitate inflation and deployment of the airbag 40 by piercing the floor carpet.

Figure 5:
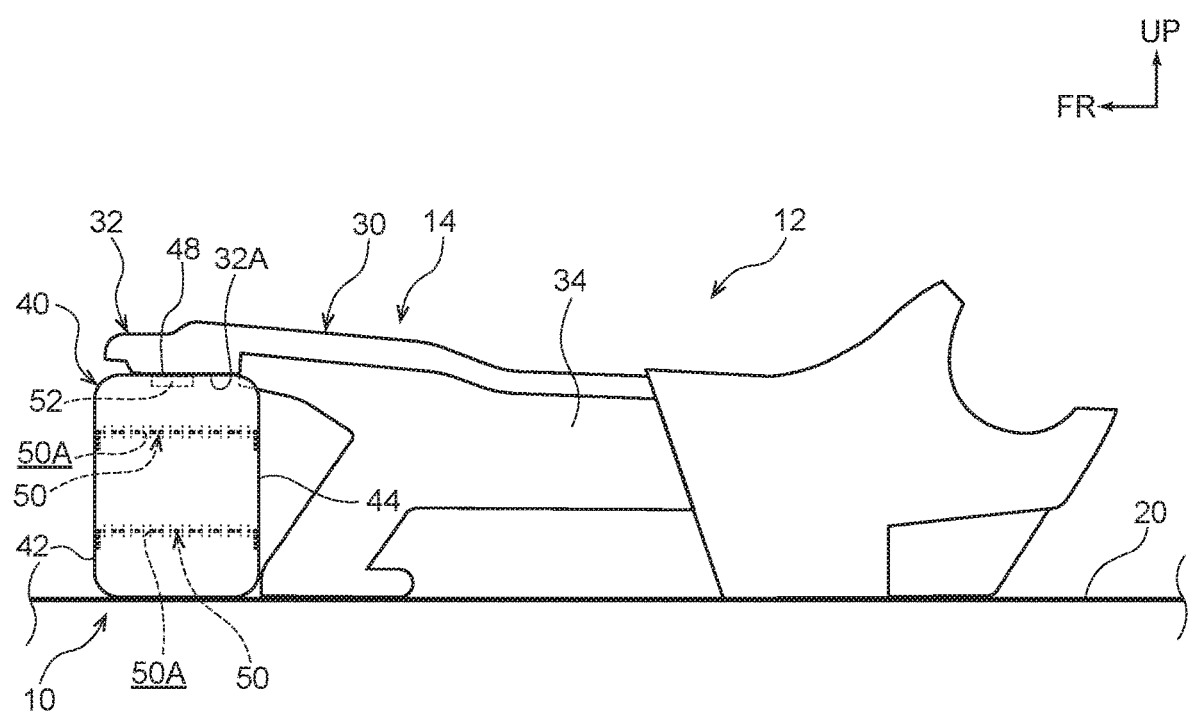
FIG. 5 is a schematic side view illustrating an inflation and deployment state of an airbag configuring the vehicle occupant restraint structure according to the second exemplary embodiment.

As illustrated in FIG. 5, according to the vehicle occupant restraint structure 10 of the second exemplary embodiment configured as described above, when a front collision of the vehicle occurs, the airbag 40 provided at a portion of the floor 20 pierces the floor carpet and instantaneously inflates and deploys toward the lower surface 32A at the front end portion 32 of the cushion pan 30, and the upper wall 48 of the airbag 40 is attracted and fixed to the lower surface 32A due to the magnet 52.

Namely, in a similar manner as in the above-described first exemplary embodiment, the airbag 40 is sandwiched between the floor 20 and the cushion pan 30 (refer to FIG. 3B). Accordingly, even if the occupant P moves toward the front side due to inertial force when a front collision of the vehicle occurs, deformation (sinking) of the front end portion of the seat cushion 14 toward the lower side is suppressed by the airbag 40.

As a result, the waist region Pw of the occupant P is inhibited from dropping, the knee region Pk of the occupant P is inhibited from abutting against the instrument panel 18, and the lap belt 28B, which is a portion of the seat belt 28, is inhibited from relatively displacing toward the upper side. Namely, it is possible to suppress a reduction in the restraining force exerted by the seat belt 28 against the waist region Pw of the occupant P.

Although explanation has been given above regarding the vehicle occupant restraint structure 10 according to the present exemplary embodiments based on the drawings, the vehicle occupant restraint structure 10 according to the present exemplary embodiments is not limited to that which is illustrated in the drawings, and appropriate design modification can be implemented within a range that does not depart from the spirit of the present disclosure. For example, a minute vent hole may be formed at the airbag 40 so as not to burst.

Further, the shape of the magnet 52 is not limited to the single rectangular flat plate shape illustrated in the drawings, and, although not illustrated in the drawings, a configuration may be provided in which, for example, the magnet 52 is configured to have a square shape, and plural magnets 52 are disposed at predetermined intervals (for example, at equal intervals) in the left-right direction. Furthermore, in the first exemplary embodiment, a configuration may be provided in which an iron plate (not illustrated in the drawings) is provided at the inner surface of the lower wall 46 of the airbag 40, and the magnet 52 is disposed at a portion of the floor carpet or the floor 20 (a portion directly below the lower wall 46).

What is claimed is:

1. A vehicle occupant restraint structure comprising:
    a vehicle seat that includes a cushion pan configuring a bottom portion of a seat cushion and supporting a seat pad, and that is provided at a floor of a vehicle cabin;
    a cross member that is provided at the floor, the cross member extending in a vehicle width direction, and having an upper surface and a front wall that is connected to the upper surface;
    a pair of slide rails that is attached to a bottom side of the vehicle seat, front sides of the slide rails being supported by the upper surface of the cross member; and
    an airbag that is provided at a lower surface of a front end portion of the cushion pan, and that inflates and deploys toward the floor and such that a rear wall of the airbag after inflation and deployment contacts a front wall of the cross member, when a front collision of a vehicle occurs.

2. The vehicle occupant restraint structure according to claim 1, further comprising:
    a slide lever that is disposed at a lower side of the lower surface of the cushion pan, and that substantially has a U-shape in a plan view,
    wherein the vehicle seat is configured to be movable in a vehicle front-rear direction along the pair of slide rails due to the slide lever being operated, and
    the airbag is configured so as to inflate and deploy through an inner side of the slide lever.

3. The vehicle occupant restraint structure according to claim 1, wherein the airbag comprises a plurality of tethers that connect a front wall and a rear wall of the airbag provided at an interior of the airbag at intervals in an up-down direction.

4. The vehicle occupant restraint structure according to claim 1, wherein the airbag comprises a magnet provided at an inner surface of an end portion at a deployment direction leading end side of the airbag.

5. A vehicle occupant restraint structure comprising:
    a vehicle seat that includes a cushion pan configuring a bottom portion of a seat cushion and supporting a seat pad, and that is provided at a floor of a vehicle cabin, the cushion pan being made of metal; and
    an airbag that is provided at a portion of the floor that is positioned directly below a lower surface of a front end portion of the cushion pan, and that inflates and deploys between the lower surface of the cushion pan and the floor such that an upper wall of the airbag after inflation and deployment contacts the lower surface of the cushion pan, when a front collision of a vehicle occurs,
    wherein the airbag comprises a magnet provided at an inner surface of the upper wall thereof, and the upper wall of the airbag after inflation and deployment is fixed to the lower surface of the cushion pan due to the magnet being attracted to the cushion pan.

6. The vehicle occupant restraint structure according to claim 5, wherein the airbag comprises a plurality of tethers that connect a front wall and a rear wall of the airbag provided at an interior of the airbag at intervals in an up-down direction.

* * * * *